(12) United States Patent
Trocki et al.

(10) Patent No.: US 11,886,394 B2
(45) Date of Patent: Jan. 30, 2024

(54) COMPOSABLE QUERY LANGUAGE GATEWAY ROUTING PROTOCOL

(71) Applicant: RED HAT, INC., Raleigh, NC (US)

(72) Inventors: Wojciech Julian Trocki, Waterford, MI (US); Hiram Remigio Chirino, Tallahassee, FL (US)

(73) Assignee: Red Hat, Inc., Raleigh, NC (US)

( * ) Notice: Subject to any disclaimer, the term of this patent is extended or adjusted under 35 U.S.C. 154(b) by 129 days.

(21) Appl. No.: 17/001,790

(22) Filed: Aug. 25, 2020

(65) Prior Publication Data

US 2022/0067002 A1 Mar. 3, 2022

(51) Int. Cl.
| | |
|---|---|
| *G06F 16/245* | (2019.01) |
| *G06F 16/21* | (2019.01) |
| *G06F 16/24* | (2019.01) |
| *H04L 67/00* | (2022.01) |
| *G06F 16/22* | (2019.01) |
| *H04L 67/1097* | (2022.01) |
| *G06F 9/54* | (2006.01) |
| *G06F 16/2458* | (2019.01) |

(52) U.S. Cl.
CPC ............ *G06F 16/213* (2019.01); *G06F 9/547* (2013.01); *G06F 16/2255* (2019.01); *G06F 16/2471* (2019.01); *H04L 67/1097* (2013.01)

(58) Field of Classification Search
None
See application file for complete search history.

(56) References Cited

U.S. PATENT DOCUMENTS

| | | | |
|---|---|---|---|
| 2014/0279838 A1* | 9/2014 | Tsirogiannis | G06F 16/22 707/603 |
| 2017/0344605 A1* | 11/2017 | Wells | G06F 16/2423 |
| 2020/0296112 A1* | 9/2020 | Namboodiri | H04L 67/02 |
| 2021/0105190 A1* | 4/2021 | Claise | H04L 41/5009 |
| 2021/0289246 A1* | 9/2021 | Wang | H04N 21/632 |

OTHER PUBLICATIONS

Raees Khan; Sustainable IoT Sensing Applications Development through GraphQL-Based Abstraction Layer; 2020; Electronics; pp. 1-23 (Year: 2020).*
GraphQL-based generic and domain specific query interfaces for JValue ODS; 2020; Kai Ronne; Department of India; pp. 1-45 (Year: 2020).*

(Continued)

*Primary Examiner* — Albert M Phillips, III
*Assistant Examiner* — Jermaine A Mincey
(74) *Attorney, Agent, or Firm* — Womble Bond Dickinson (US) LLP

(57) ABSTRACT

A query request for data associated with a plurality of services executed by a plurality of host systems is received. A type of query associated with the query request is identified. A subset of the plurality of services comprising data associated with the type of query is identified using a query routing data structure, wherein the query routing data structure is received from a gateway system that generates the query routing data structure in view of receiving corresponding service schemas from the plurality of services. The query request is transmitted to the subset of the plurality of services identified using the query routing data structure.

19 Claims, 10 Drawing Sheets

(56) References Cited

OTHER PUBLICATIONS

Giroux, M. (2019). "The rise of GraphQL 'Overambitious API gateways'". downloaded https://medium.com/@_xuorig_/the-rise-of-graphql-overambitious-api-gateways-2c6f054e80a1, 3 pages.
Bezugla, K. (Apr. 19, 2019). "GraphQL: Core Features, Architecture, Pros, and Cons". DZone, 16 pages.
Touronen, V. (Mar. 24, 2019). "Microservice architecture patterns with GraphQL" University of Helsinki, Department of Computer Science, 60 pages.

\* cited by examiner

US 11,886,394 B2

COMPOSABLE QUERY LANGUAGE GATEWAY ROUTING PROTOCOL

TECHNICAL FIELD

Aspects of the present disclosure relate to a microservice architecture, and more particularly, to a composable query language gateway protocol.

BACKGROUND

Microservice architecture is an architectural style of a computing system that structures an application as a collection of services. The services can be independently developed, tested and deployed by different teams. Microservice architectures enable the deployment of large, complex applications at a rapid pace.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
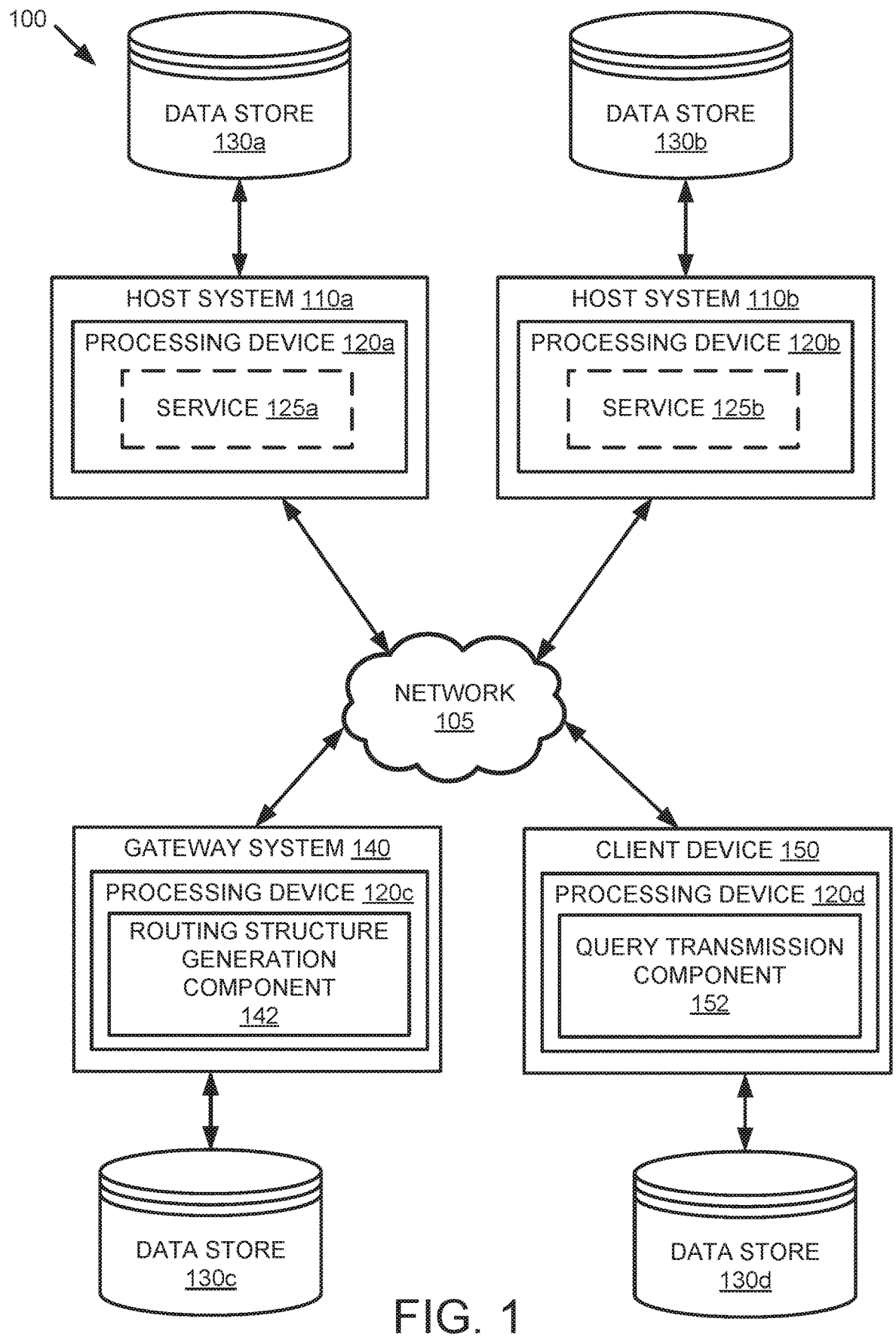
FIG. 1 is a block diagram that illustrates an example microservice architecture, in accordance with some embodiments.

On a microservice architecture, an application may be made up of multiple services. Each of the services may include different types of data and corresponding service schemas. The service schemas may correspond to the organization or structure of the data for the corresponding services. To acquire data from the various services of the architecture, a client device may utilize a query language application programming interface (API), such as GraphQL™, to query the services for particular data. For example, a client device may utilize a query language API to query services to data associated with users of the application.

In a conventional microservice architecture, the query language API acts as a gateway on the edge of backend services. When a client builds an application that utilizes multiple services, if the client wishes to query the services, the client is required to transmit separate queries to each of the different services. The client then manually compiles the results of the multiple queries that are received from the different services. Such a process is tedious, time consuming, and fraught with errors, particularly for applications that use large numbers of services.

Aspects of the disclosure address the above-noted and other deficiencies by utilizing a composable query language gateway for transmitting queries to services of a microservice architecture. The microservice architecture may include a gateway system that generates a query routing data structure for the multiple services used by an application. Processing logic of a processing device of the gateway system receives service schemas from the different services of the application. The processing logic identifies and associates the different services with different types of queries that may be received by a client device. For example, the processing logic may identify a first set of services that include data associated with tasks and a second set of services that include data associated with users of the application.

The processing logic may use the service schemas to generate a gateway schema that is used to build the query routing data structure. The gateway schema may correlate the service schemas of the different services to query requests of a client device. For example, the gateway schema may correlate the service schemas for services that include data associated with users with a query request for user data received by a client device.

Upon generating the gateway schema, the processing logic may generate a query routing data structure. The query routing data structure may be used by a client device and indicate which services a query request is to be sent to based on the type of query that is received by the client device. For example, if a query request for user data is received by a client device, the query routing data structure may indicate which services include user data.

The processing logic may provide the query routing data structure to a client device for storage in a memory that is accessible by the client device. As query requests are received from users, processing logic of a processing device of the client device may utilize the query routing data structure to determine which services to transmit the query request to. Upon transmitting the query request to the determined services, the processing logic may receive the results of the query from the services and aggregate the data for presentation to the user.

Embodiments of the disclosure provide for an improved microservice architecture by utilizing a gateway system to generate a query routing data structure in view of service schemas that are received from different services executed by the microservice architecture. The query routing data structure eliminates the need for a user to transmit separate queries to each of the services to acquire data and manually aggregate the data from the services, improving the performance of the microservice architecture.

FIG. 1 is a block diagram that illustrates an example microservice architecture 100, in accordance with some embodiments of the present disclosure. The microservice architecture 100 may include host systems 110a, b, gateway system 140, and client device 150.

As illustrated in FIG. 1, microservice architecture 100 includes host systems 110a, b that include computing processing devices 120a, b and data stores 130a, b, respectively. The microservice architecture 100 may also include a gateway system 140 that includes a computing processing device 120c and data store 130c and client device 150 that includes a computing processing device 120d and data store 130d. The host systems 110a, b, gateway system 140, and client device 150 are coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WiFi™ hotspot connected with the network 105 and/or a wireless carrier system that can be implemented using various data processing equipment, communication towers (e.g. cell towers), etc. The network 105 may carry communications (e.g., data, message, packets, frames, etc.) between the various components of host systems 110a, b.

The data stores 130a-d may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The host systems 110a, b, gateway system 140, and client device 150 may include any suitable type of computing device or machine that has a programmable processor including, for example, server computers, desktop computers, laptop computers, tablet computers, smartphones, set-top boxes, etc. In some examples, host systems 110a, b, gateway system 140, and client device 150 may comprise a single machine or may include multiple interconnected machines (e.g., multiple servers configured in a cluster). Host systems 110a, b, gateway system 140, and client device 150 may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

Processing device 120a of host system 110a and processing device 120b of host system 110b may execute services 125a and 125b of an application, respectively. In some embodiments, service 125a and/or service 125b may be executed within containers that serve as isolated execution environments for service 125a and/or service 125b. In embodiments, service 125a and/or service 125b may be executed by one or more virtual machines (VMs) that are software implementations of a machine that executes programs as though it was an actual physical machine. In some embodiments, service 125a and service 125b may utilize different frameworks and/or programming languages. Although illustrated as being executed by two different host systems (e.g., host systems 110a, b), in embodiments service 125a and service 125b may be executed by the same host system. Additionally, although illustrated as having two host systems, embodiments of the disclosure may include a microservice architecture having any number of host systems executing any number of services.

In embodiments, processing device 120c may execute a routing structure generation component 142. The routing structure generation component 142 may receive service schemas from service 125a and service 125b executed by host system 110a and host system 110b, respectively. The routing structure generation component 142 may generate a gateway schema in view of the received service schemas to correlate the service schemas to different types of queries. The routing structure generation component 142 may generate a query routing data structure using the gateway schema. The routing structure generation component 142 may provide the query routing data structure to client device 150.

In embodiments, the processing device 120d may execute a query transmission component 152. The query transmission component 152 may receive a query request for data associated with service 125a and/or service 125b (or any other services executed by microservice architecture 100). The query transmission component 152 may identify a type of query associated with the query request. The query transmission component 152 may use the query routing data structure to identify which services to transmit the query request to in view of the type of query. The query transmission component 152 may transmit the query request to the identified services. Further details regarding routing structure generation component 142 and query transmission component 152 will be discussed at FIGS. 2-9 below.

Figure 2:
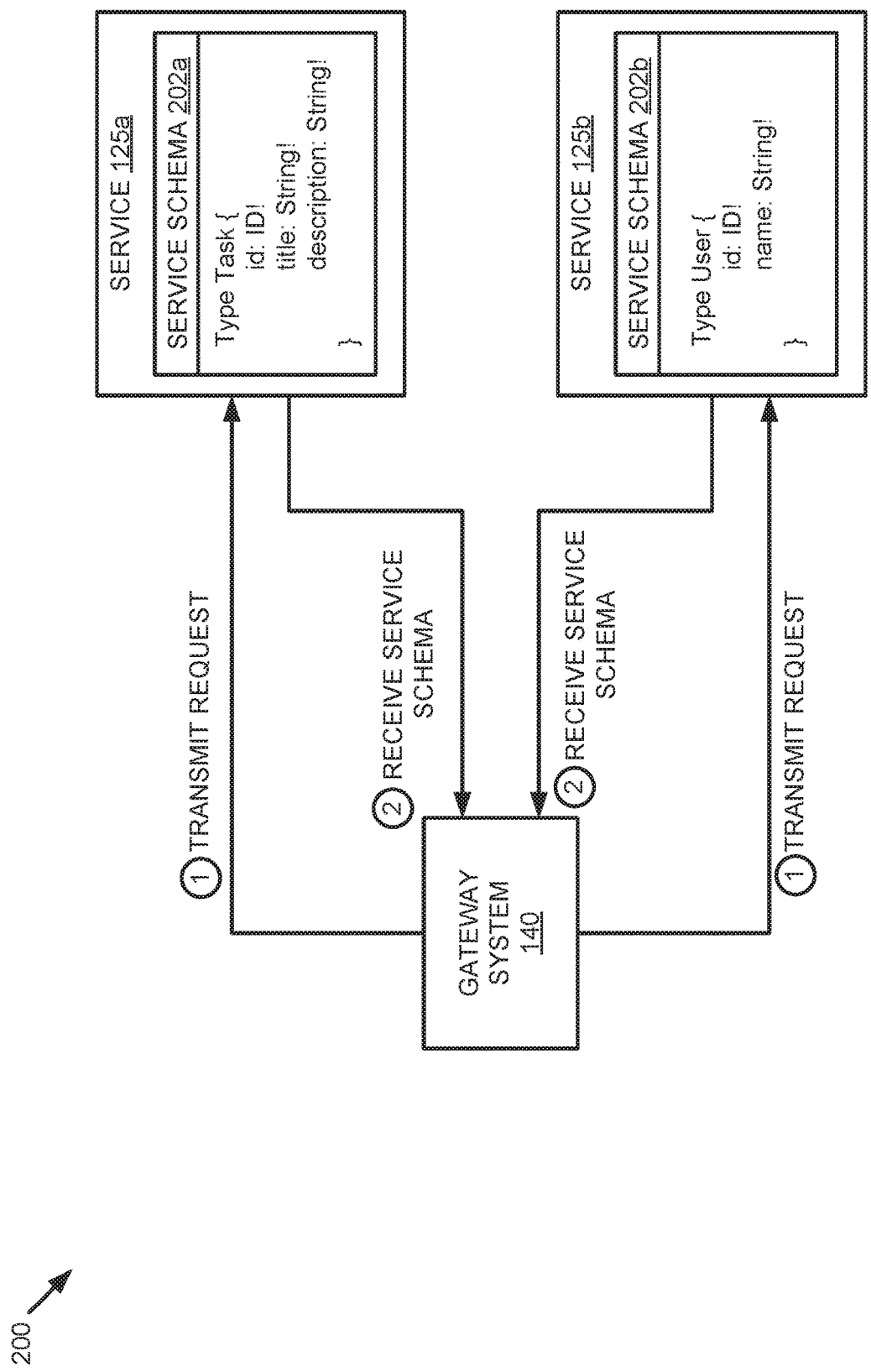
FIG. 2 is an illustration of an example of a gateway system of a microservice architecture receiving service schemas from services, in accordance with embodiments of the disclosure.

FIG. 2 is an illustration of an example of a gateway system of a microservice architecture 200 receiving service schemas from services, in accordance with embodiments of the disclosure. The microservice architecture 200 may include gateway system 140, service 125a, and service 125b, as previously described at FIG. 1.

Service 125a may have a service schema 202a and service 125b may have a service schema 202b. Service schema 202a and service schema 202b may correspond to the organization or structure of the data for service 125a and service 125b, respectively. For example, service schema 202a may indicate that the data at service 125a is associated with tasks and includes task identifications (e.g., ID), titles, and descriptions. In another example, service schema 202b may indicate that the data at service 125b is associated with users and includes user identifications (e.g., ID) and user names.

In embodiments, the gateway system 140 may transmit a request via a network (e.g., network 105 of FIG. 1) to the various services that are running on the microservice architecture 200 for the corresponding service schemas of the services. For example, the gateway system 140 may transmit requests to service 125a and service 125b for their corresponding service schemas. Service 125a and service 125b may transmit service schema 202a and service schema 202b, respectively, to the gateway system 140 via the network, where service schema 202a and service schema 202b are received by the gateway system 140.

In embodiments, the gateway system 140 may also receive address information associated with the services of each service schema. For example, the gateway system 140 may receive address information associated with service 125*a* and service 125*b*. In embodiments, the address information may correspond to uniform resource locators (URLs) of the services. In some embodiments, the address information may correspond to other types of address information, such as internet protocol (IP) addresses, media access control (MAC) addresses, or the like.

Figure 3:
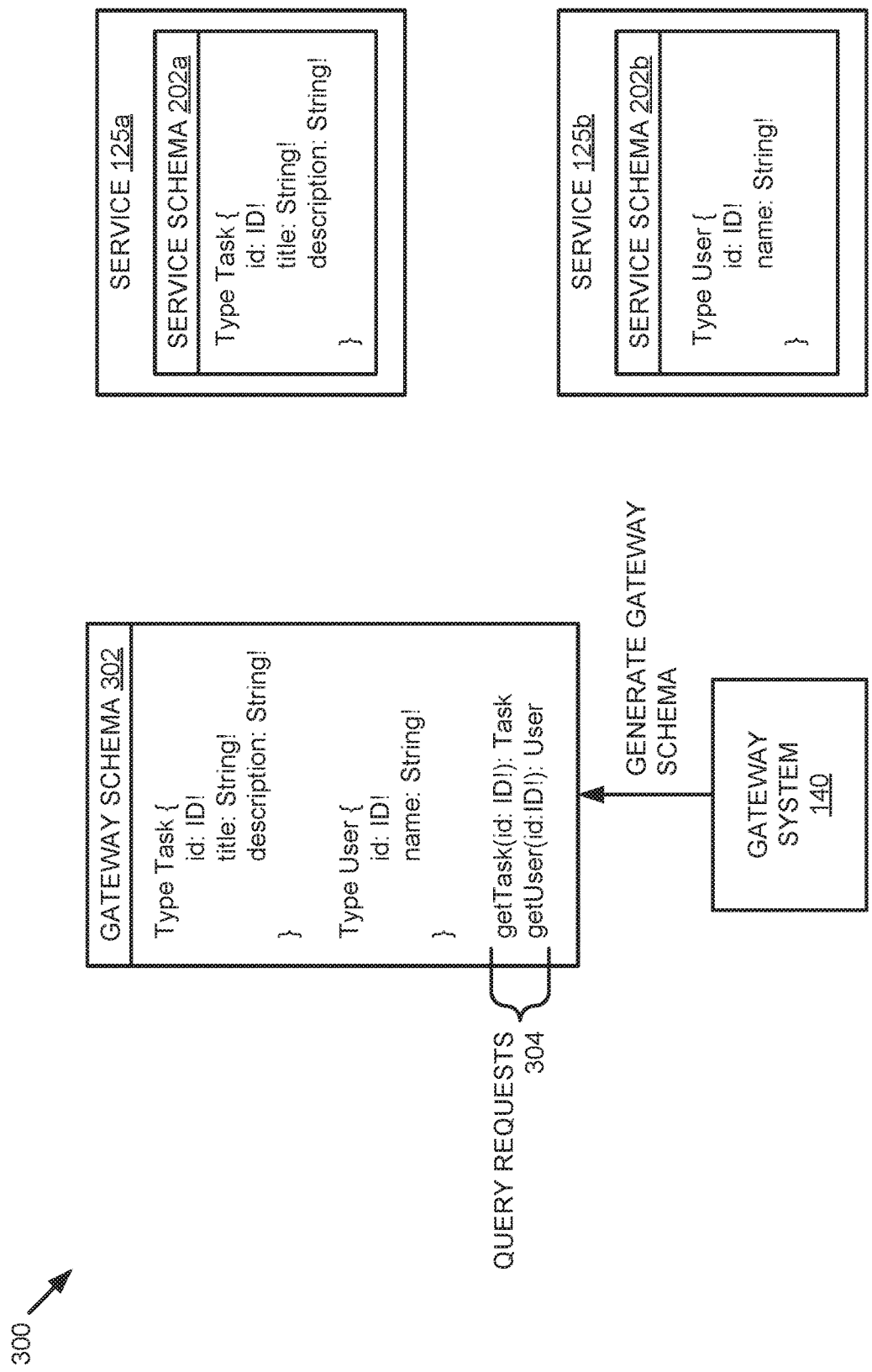
FIG. 3 is an illustration of an example of a gateway system of a microservice architecture generating a gateway schema, in accordance with embodiments of the disclosure.

FIG. 3 is an illustration of an example of a gateway system of a microservice architecture 300 generating a gateway schema, in accordance with embodiments of the disclosure. Upon receiving service schema 202*a* and service schema 202*b*, the gateway system 140 may generate a gateway schema 302 that merges the received service schemas into a composable query language schema. In embodiments, the gateway schema 302 may include query language metadata and/or application programming interface (API) discovery capabilities that may be used by client device(s) (not shown) submitting queries to the microservice architecture 300.

The gateway system 140 may associate types of queries with service 125*a* and service 125*b* in view of their corresponding service schemas. For example, the gateway system 140 may associate service 125*a* with a task type of query because the service schema 202*a* indicates that service 125*a* includes data associated with tasks. In another example, the gateway system 140 may associate service 125*b* with a user type of query because the service schema 202*b* indicates that service 125*b* includes data associated with users.

In embodiments, the gateway schema 302 may correlate service schemas (e.g., service schema 202*a* and service schema 202*b*) to query requests 304 that may be received from a client device. For example, the gateway schema 302 may correlate a query request "getTask" to service schema 202*a* which has data associated with tasks and a query request "getUser" to service schema 202*b* which has data associated with users.

Figure 4:
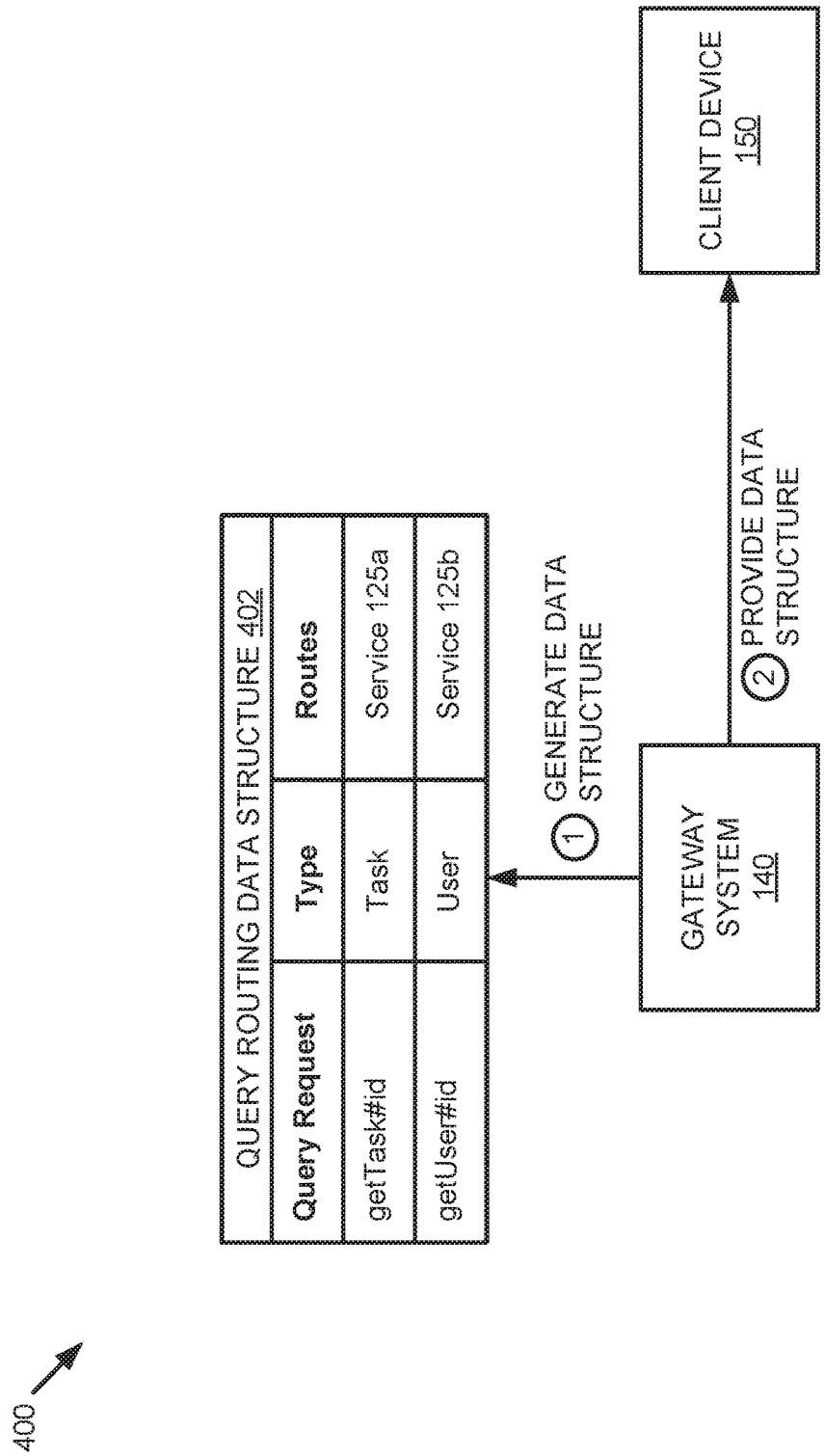
FIG. 4 is an illustration of an example of a gateway system of a microservice architecture generating a query routing data structure, in accordance with embodiments of the disclosure.

FIG. 4 is an illustration of an example of a gateway system of a microservice architecture 400 generating a query routing data structure, in accordance with embodiments of the disclosure. Upon generating the gateway schema, the gateway system may use the gateway schema to calculate a query routing data structure 402. The query routing data structure 402 may be used by a client device 150 to route query requests to the appropriate services executed by host systems (not shown) of the microservice architecture 400. The query routing data structure 402 may be used by client device 150 to match a query request (or a batch including multiple query requests) received by the client device 150 to one or more services of the microservice architecture 400.

The query routing data structure 402 may include query requests that may be received by client device 150, corresponding types for the different query requests, and routes indicating which services query requests are to be transmitted to in view of the type of the query. For example, the query routing data structure 402 includes a query request of "getTask(id:ID)", indicates that the type of the query request is a task, and that the query request should be transmitted to service 125*a* which includes data associated with tasks. In embodiments, the query routing data structure 402 may be a hashmap data structure that maps keys to values of the query routing data structure 402. In some embodiments, other types of data structures may be used for the query routing data structure 402.

In embodiments, the query routing data structure 402 may include address information associated with the services of microservice architecture 400. For example, the "Routes" field of the query routing data structure 402 may include URLs of the services of the microservice architecture 400.

Upon generating the query routing data structure 402, the gateway system 140 may provide the query routing data structure 402 to client device 150. The client device 150 may store the query routing data structure 402 in a memory of the client device 150, such as data store 130*d* of FIG. 1.

It should be noted that the information shown in query routing data structure 402 is for illustrative purposes only. Embodiments of the disclosure may utilize query routing data structures that include other types or combinations of information that may be used by a client devices to transmit queries to services of a microservice architecture.

Figure 5:
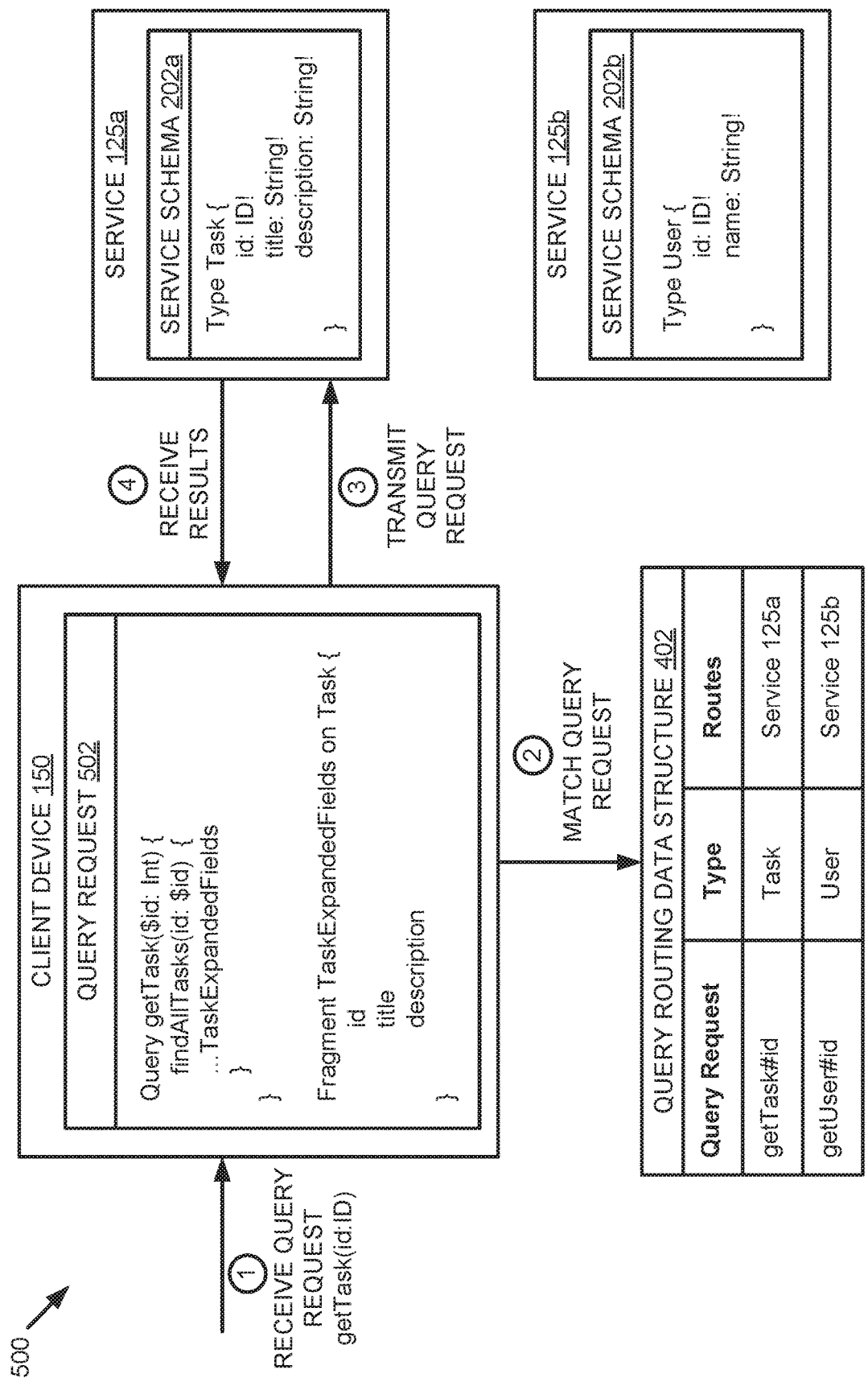
FIG. 5 is an illustration of an example of a client device of a microservice architecture using a query routing data structure to transmit a query request, in accordance with embodiments of the disclosure.

FIG. 5 is an illustration of an example of a client device of a microservice architecture 500 using a query routing data structure to transmit a query request, in accordance with embodiments of the disclosure. In FIG. 5, the client device 150 has received a query request 502 "getTask(id:ID)" that is requesting data associated with tasks performed by service(s) of the microservice architecture 500. In embodiments, the client device 150 may receive the query request 502 from a user of the client device 150. For example, the client device may receive the query request 502 from a user of the client device via a user interface, such as a graphical user interface (GUI).

Upon receiving the query request, the client device 150 may match the query request 502 to one or more entries in the query routing data structure 402. In embodiments, the client device 150 may match the query request 502 to the one or more entries in view of a type of the query. For example, the client device 150 may match the query request 502 "getTask(id:ID)" with one or more entries in the query routing data structure 402 that correspond to "Task" types of queries.

The client device 150 may transmit the query request 502 to the services in the query routing data structure 402 that match the query request 502. For example, the client device 150 may transmit query request 502 to service 125*a* because the query routing data structure 402 indicates that service 125*a* includes data associated with tasks. In embodiments, the client device 150 may transmit the query request 502 using address information of the service(s) included in the query routing data structure 402. In embodiments, the client device 150 may make multiple query requests to various services of the microservice architecture 400 to acquire data.

After transmitting the query request 502 to service 125*a*, the client device 150 may receive the results of the query from service 125*a*. The results of the query may correspond to the data requested by the query request. For example, the results of the query may correspond to data that includes the identifications, titles, and descriptions of the tasks associated with service 125*a*.

In embodiments where a query request is sent to multiple services, the client device 150 may utilize result normalization to enable the client device 150 to receive partial results from different services at different times, which allows the client device 150 to defer multiple requests and receive results from the different individual services without waiting for all of the services to respond.

Figure 6:
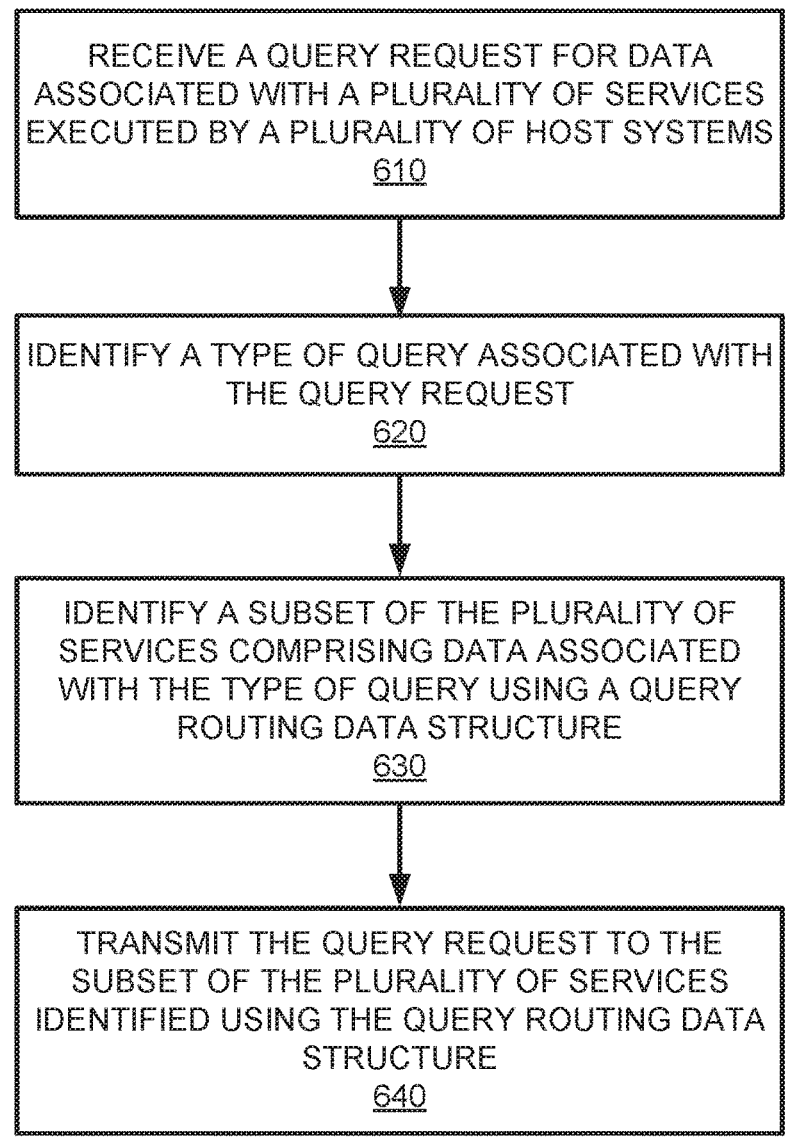
FIG. 6 is a flow diagram of a method of using a query data structure to transmit a query request, in accordance with some embodiments.

FIG. 6 is a flow diagram of a method 600 of using a query data structure to transmit a query request, in accordance with some embodiments. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 600 may be performed by query transmission component 152 of client device 150 of FIG. 1.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

Method 600 begins at block 610, where the processing logic receives a query request for data associated with a plurality of services executed by a plurality of host systems. In embodiments, the query request may be received by the processing logic from a user via a user interface.

At block 620, the processing logic identifies a type of query associated with the query request. For example, the processing logic may identify the type of query as corresponding to data associated with tasks or users of an application.

At block 630, the processing logic identifies a subset of the plurality of services comprising data associated with the type of query using a query routing data structure. The query routing data structure may be received from a gateway system that generates the query routing data structure in view of receiving corresponding service schemas from the plurality of services, as previously described. The processing logic may identify the subset of the plurality of services by matching the query request to the type of query indicated in the query routing data structure. In some embodiments, the subset may include one or more services of the plurality of services. In embodiments, the subset may include the entirety of the plurality of services.

At block 640, the processing logic transmits the query request to the subset of the plurality of services identified using the query routing data structure. In embodiments, the processing logic may transmit the query request using address information of the subset of the plurality of services that is included in the query routing data structure.

Figure 7:
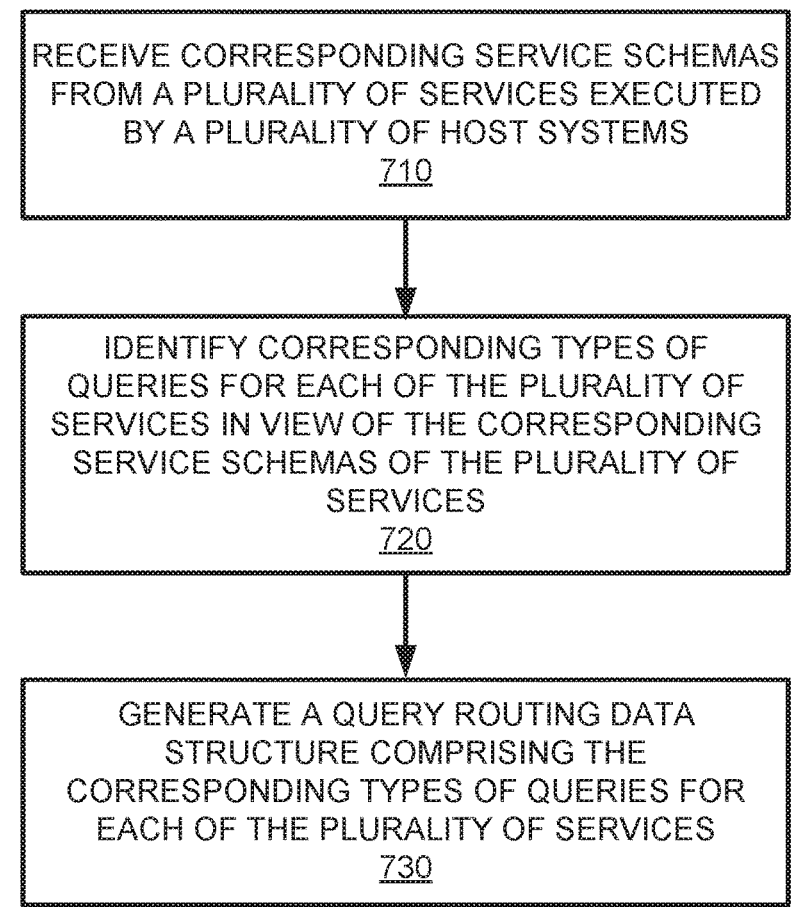
FIG. 7 is a flow diagram of a method of generating a query routing data structure, in accordance with some embodiments.

FIG. 7 is a flow diagram of a method 700 of generating a query routing data structure, in accordance with some embodiments. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 700 may be performed by routing structure generation component 142 of gateway system 140 of FIG. 1.

With reference to FIG. 7, method 700 illustrates example functions used by various embodiments. Although specific function blocks ("blocks") are disclosed in method 700, such blocks are examples. That is, embodiments are well suited to performing various other blocks or variations of the blocks recited in method 700. It is appreciated that the blocks in method 700 may be performed in an order different than presented, and that not all of the blocks in method 700 may be performed.

Method 700 begins at block 710, where the processing logic receives corresponding service schemas from a plurality of services executed by a plurality of host systems. In embodiments, the processing logic may receive the corresponding service schemas in response to transmitting a request for service schemas to the plurality of services.

At block 720, the processing logic identifies corresponding types of queries for each of the plurality of services in view of the corresponding service schemas of the plurality of services. For example, the processing logic may identify a first set of services as corresponding to a "Task" type of query and a second set of services as corresponding to a "Users" type of a query.

At block 730, the processing logic generates a query routing data structure comprising the corresponding types of queries for each of the plurality of services.

Figure 8:
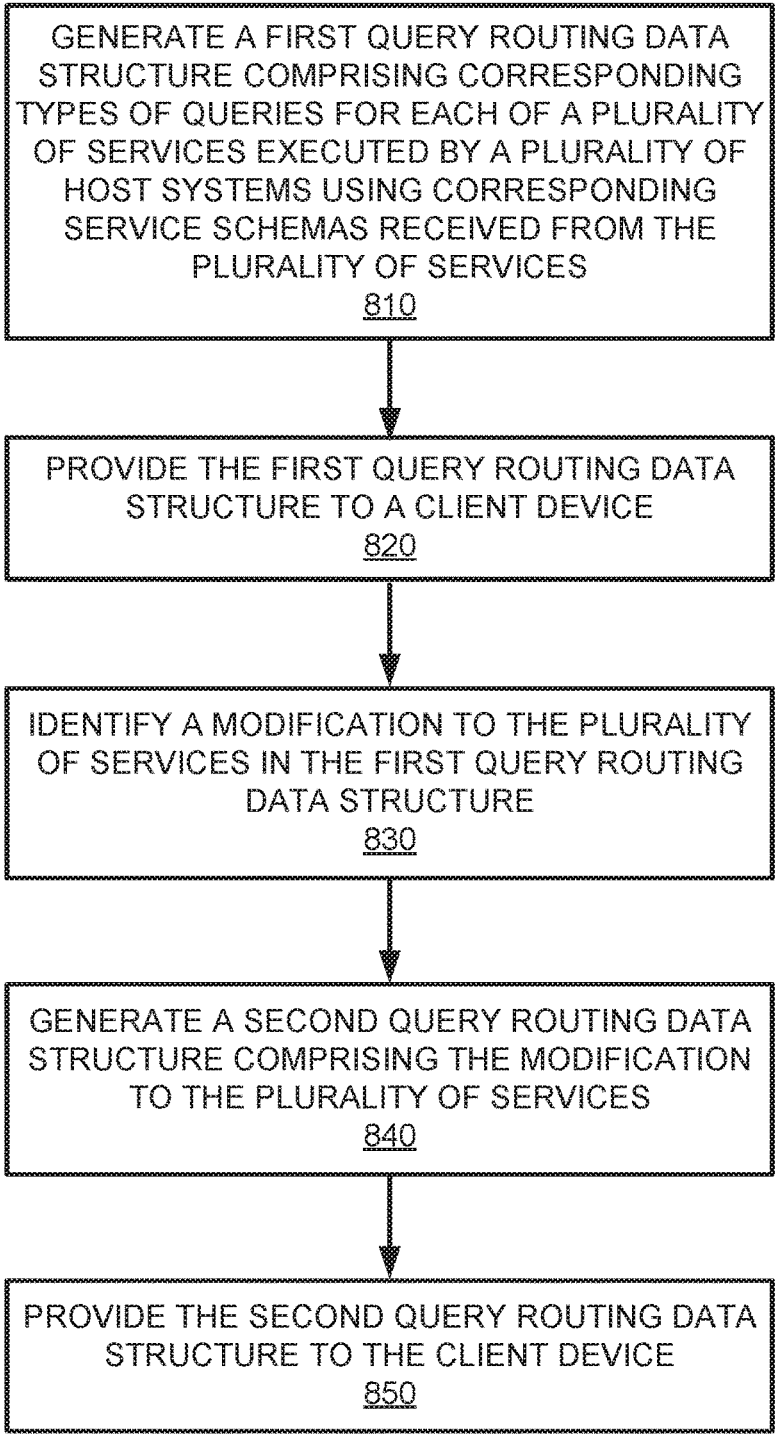
FIG. 8 is a flow diagram of a method of dynamically generating a query routing data structures upon identifying a modification to services of a microservice architecture, in accordance with some embodiments.

FIG. 8 is a flow diagram of a method 800 of dynamically generating a query routing data structures upon identifying a modification to services of a microservice architecture, in accordance with some embodiments. Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 800 may be performed by routing structure generation component 142 of gateway system 140 of FIG. 1.

With reference to FIG. 8, method 800 illustrates example functions used by various embodiments. Although specific function blocks ("blocks") are disclosed in method 800, such blocks are examples. That is, embodiments are well suited to performing various other blocks or variations of the blocks recited in method 800. It is appreciated that the blocks in method 800 may be performed in an order different than presented, and that not all of the blocks in method 800 may be performed.

Method 800 begins at block 810, where the processing logic generates a first query routing data structure comprising corresponding types of queries for each of a plurality of services executed by a plurality of host systems using corresponding service schemas received from the plurality of services.

At block 820, the processing logic provides the first query routing data structure to a client device.

At block 830, the processing logic identifies a modification to the plurality of services in the first query routing data structure. In embodiments, the processing logic may identify a modification to the plurality of services by transmitting a request to the services of the microservice architecture for their corresponding service schemas. The processing logic may receive the corresponding service schemas from the services and compare the service schemas to the gateway schema and/or first query routing data structure to determine whether there has been a modification to the plurality of services. In some embodiments, the modification may correspond to an addition or removal of one or more services from the plurality of services. In embodiments, the modification may correspond to a modification to the service schemas of one or more of the plurality of services. In an embodiment, the modification may correspond to a migration of one or more of the services from one host system to another host system of the microservice architecture.

At block 840, the processing logic generates a second query routing data structure comprising the modification to the plurality of services. In embodiments, the processing logic may generate a gateway schema that includes the modification to the plurality of services. The gateway schema may be used to calculate the second query routing data structure, as previously described.

At block 850, the processing logic provides the second query routing data structure to the client device.

Figure 9:
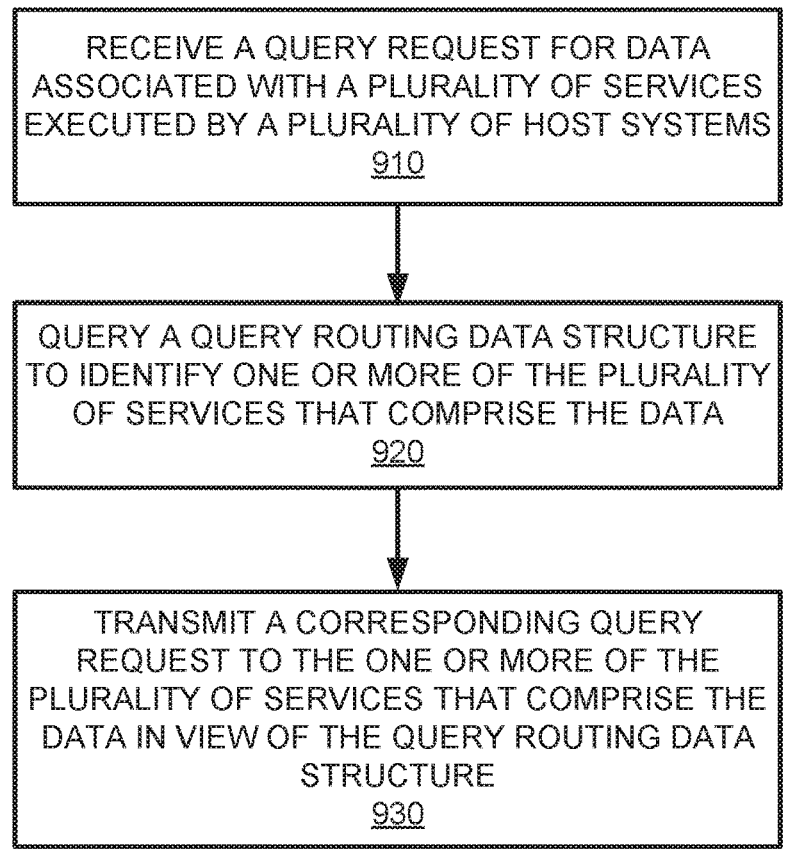
FIG. 9 is a flow diagram of a method of transmitting queries to services by utilizing a query routing data structure, in accordance with some embodiments.

FIG. 9 is a flow diagram of a method 900 of transmitting queries to services by utilizing a query routing data structure, in accordance with some embodiments. Method 900 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 900 may be performed by query transmission component 152 of client device 150 of FIG. 1.

With reference to FIG. 9, method 900 illustrates example functions used by various embodiments. Although specific function blocks ("blocks") are disclosed in method 900, such blocks are examples. That is, embodiments are well suited to performing various other blocks or variations of the blocks recited in method 900. It is appreciated that the blocks in method 900 may be performed in an order different than presented, and that not all of the blocks in method 900 may be performed.

Method 900 begins at block 910, where the processing logic receives a query request for data associated with a plurality of services executed by a plurality of host systems.

At block 920, the processing logic queries a query routing data structure to identify one or more of the plurality of services that comprise the data. The query routing data structure may be received from a gateway system, as previously described.

At block 930, the processing logic transmits a corresponding query request to the one or more of the plurality of services that comprise the data in view of the query routing data structure.

Figure 10:
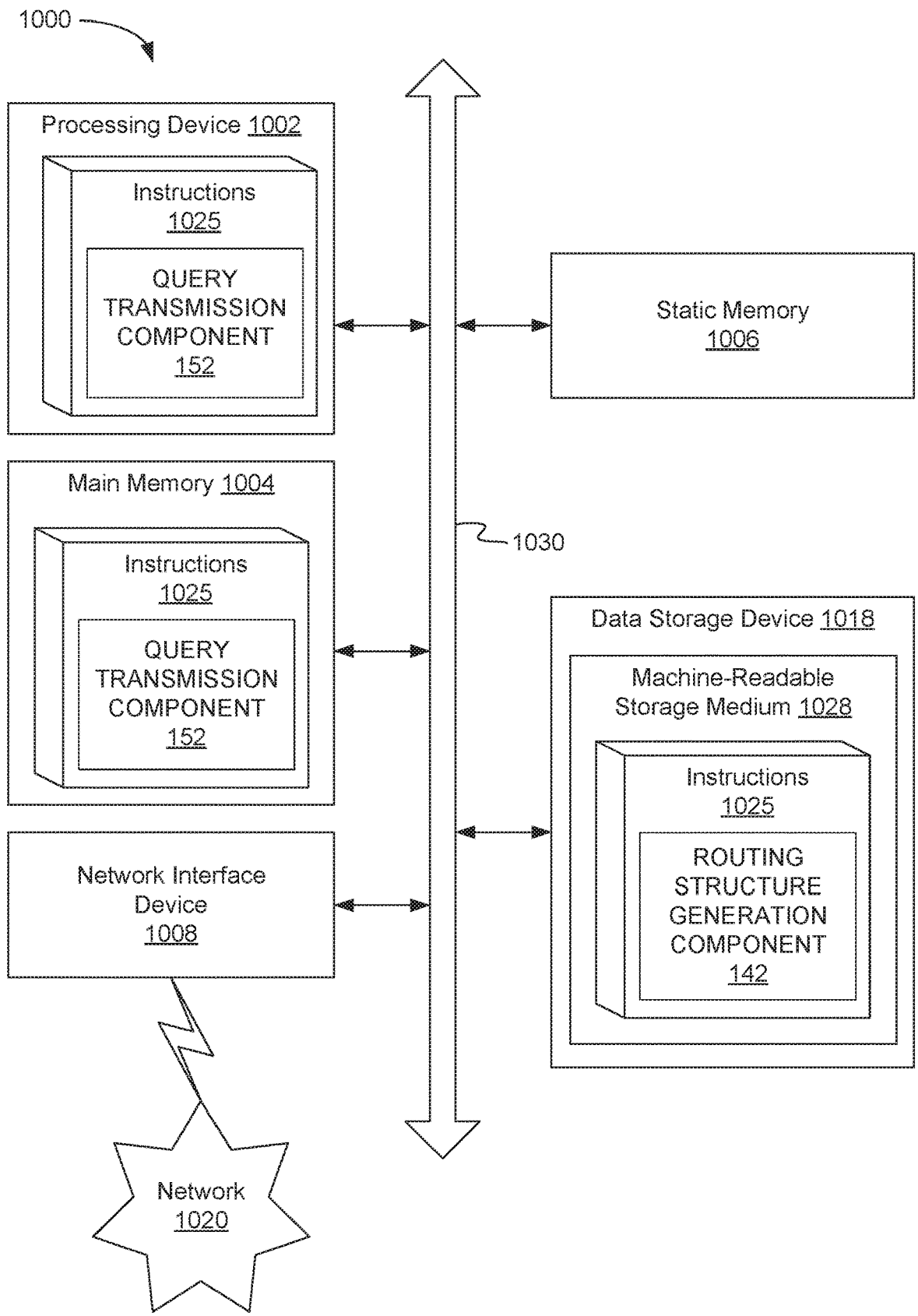
FIG. 10 is a block diagram of an example apparatus that may perform one or more of the operations described herein, in accordance with some embodiments of the present disclosure.

FIG. 10 is a block diagram of an example computing device 1000 that may perform one or more of the operations described herein, in accordance with some embodiments. Computing device 1000 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1000 may include a processing device (e.g., a general purpose processor, a PLD, etc.) 1002, a main memory 1004 (e.g., synchronous dynamic random access memory (DRAM), read-only memory (ROM)), a static memory 1006 (e.g., flash memory and a data storage device 1018), which may communicate with each other via a bus 1030.

Processing device 1002 may be provided by one or more general-purpose processing devices such as a microprocessor, central processing unit, or the like. In an illustrative example, processing device 1002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1002 may also comprise one or more special-purpose processing devices such as an application specific integrated circuit (ASIC), a field programmable gate array (FPGA), a digital signal processor (DSP), network processor, or the like. The processing device 1002 may be configured to execute the operations described herein, in accordance with one or more aspects of the present disclosure, for performing the operations and steps discussed herein.

Computing device 1000 may further include a network interface device 1008 which may communicate with a network 1020. The computing device 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, video display unit 1010, alphanumeric input device 1012, and cursor control device 1014 may be combined into a single component or device (e.g., an LCD touch screen).

Data storage device 1018 may include a computer-readable storage medium 1028 on which may be stored one or more sets of instructions 1025 that may include instructions for a routing structure generation component, e.g., routing structure generation component 142 or a query transmission component, e.g., query transmission component 152 for carrying out the operations described herein, in accordance with one or more aspects of the present disclosure. Instructions 1025 may also reside, completely or at least partially, within main memory 1004 and/or within processing device 1002 during execution thereof by computing device 1000, main memory 1004 and processing device 1002 also constituting computer-readable media. The instructions 1025 may further be transmitted or received over a network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method comprising receiving a query request for data associated with a plurality of services executed by a plurality of host systems; identifying, by a processing device, a type of query associated with the query request; identifying a subset of the plurality of services comprising data associated with the type of query using a query routing data structure, wherein the query routing data structure is received from a gateway system that generates the query routing data structure in view of receiving corresponding service schemas from the plurality of services; and transmitting the query request to the subset of the plurality of services identified using the query routing data structure.

Example 2 is the method of Example 1, wherein the query routing data structure comprises address information associated with the plurality of services.

Example 3 is the method of Example 1, wherein the query routing data structure comprises corresponding types of operations associated with each of the plurality of services.

Example 4 is the method of Example 1, wherein the subset of the plurality of services comprise two or more services that are executed by two or more different host systems of the plurality of host systems.

Example 5 is the method of Example 1, further comprising receiving first results of the query request from a first service of the subset of the plurality of services at a first time; and receiving second results of the query request from a second service of the subset of the plurality of services at a second time that is different than the first time.

Example 6 is the method of Example 1, wherein the query routing data structure comprises a hashmap data structure.

Example 7 is the method of Example 1, wherein the plurality of services comprise a first service that utilizes a first framework and a second service that utilizes a second framework that is different than the first framework.

Example 8 is the method of Example 1, wherein the plurality of services comprise a first service that utilizes a first programming language and a second service that utilizes a second programming language that is different than the first programming language.

Example 9 is an apparatus comprising a memory; and a processing device, operatively coupled to the memory, to receive corresponding service schemas from a plurality of services executed by a plurality of host systems; identify corresponding types of queries for each of the plurality of services in view of the corresponding service schemas of the plurality of services; and generate a query routing data structure comprising the corresponding types of queries for each of the plurality of services.

Example 10 is the system of Example 9, wherein the processing device is further to generate a gateway schema that correlates the corresponding service schemas to query requests received by a client device.

Example 11 is the system of Example 10, wherein the query routing data structure is generated in view of the gateway schema.

Example 12 is the system of Example 9, wherein the processing device is further to provide the query routing data structure to a client device, wherein the client device is to transmit query requests to the plurality of services in view of the query routing data structure.

Example 13 is the system of Example 9, wherein the query routing data structure comprises address information associated with the plurality of services.

Example 14 is the system of Example 9, wherein the processing device is further to transmit a request for the corresponding service schemas to each of the plurality of services.

Example 15 is the system of Example 9, wherein the plurality of services comprise a first service that utilizes a first programming language and a second service that utilizes a second programming language that is different than the first programming language.

Example 16 is a non-transitory computer-readable storage medium including instructions that, when executed by a processing device, cause the processing device to generate a first query routing data structure comprising corresponding types of queries for each of a plurality of services executed by a plurality of host systems using corresponding service schemas received from the plurality of services executed by a plurality of host systems; provide the first query routing data structure to a client device, wherein the client device is to transmit query requests to the plurality of services in view of the first query routing data structure; identify a modification to the plurality of services in the first query routing data structure; generate a second query routing data structure comprising the modification to the plurality of services; and provide the second query routing data structure to the client device.

Example 17 is the non-transitory computer-readable storage medium of Example 16, wherein the modification to the plurality of services comprises a removal of one or more services from the plurality of services.

Example 18 is the non-transitory computer-readable storage medium of Example 16, wherein the modification to the plurality of services comprises an addition of one or more services to the plurality of services.

Example 19 is the non-transitory computer-readable storage medium of Example 18, wherein the modification to the plurality of services comprises a migration of one or more services of the plurality of services.

Example 20 is the non-transitory computer-readable storage medium of Example 16, wherein the first query routing data structure and the second query routing data structure comprise address information associated with the plurality of services.

Example 21 is the non-transitory computer-readable storage medium of Example 16, wherein the processing device is further to transmit a request for the corresponding service schemas to each of the plurality of services, wherein the modification to the plurality of services is identified in response receiving the corresponding service schemas from the plurality of services.

Example 22 is the non-transitory computer-readable storage medium of Example 16, wherein the processing device is further to generate a gateway schema that correlates the corresponding service schemas to query requests received by a client device.

Example 23 is the non-transitory computer-readable storage medium of Example 16, wherein the query routing data structure is generated in view of the gateway schema.

Example 24 is a method comprising receiving a query request for data associated with a plurality of services executed by a plurality of host systems; querying, by a processing device, a query routing data structure to identify one or more of the plurality of services that comprise the data, wherein the query routing data structure is received from a gateway system that generates the query routing data structure in view of receiving corresponding service schemas from the plurality of services; and transmitting a corresponding query request to the one or more of the plurality of services that comprise the data in view of the query routing data structure.

Example 25 is the method of Example 24, wherein the query routing data structure comprises address information associated with the plurality of services.

Example 26 is the method of Example 24, further comprising receiving first results of a first corresponding query request from a first service of the one or more of the plurality of services at a first time; and receiving second results of a second corresponding query request from a second service of the one or more of the plurality of services at a second time that is different than the first time.

Example 27 is the method of Example 26, wherein the first service utilizes a first programming language and the second service utilizes a second programming language that is different than the first programming language.

Example 28 is the method of Example 24, wherein the one or more of the plurality of services are identified in view of a type of the query request.

Example 29 is an apparatus comprising means for receiving a query request for data associated with a plurality of services executed by a plurality of host systems; means for identifying a type of query associated with the query request; means for identifying a subset of the plurality of services comprising data associated with the type of query using a query routing data structure, wherein the query routing data structure is received from a gateway system that generates the query routing data structure in view of receiving corresponding service schemas from the plurality of services; and means for transmitting the query request to the subset of the plurality of services identified using the query routing data structure.

Example 30 is the apparatus of Example 29, wherein the query routing data structure comprises address information associated with the plurality of services.

Example 31 is the apparatus of Example 29, wherein the query routing data structure comprises corresponding types of operations associated with each of the plurality of services.

Example 32 is the apparatus of Example 29, wherein the subset of the plurality of services comprise two or more services that are executed by two or more different host systems of the plurality of host systems.

Example 33 is the apparatus of Example 29, further comprising means for receiving first results of the query request from a first service of the subset of the plurality of services at a first time; and means for receiving second results of the query request from a second service of the subset of the plurality of services at a second time that is different than the first time.

Example 34 is the apparatus of Example 29, wherein the query routing data structure comprises a hashmap data structure.

Example 35 is the apparatus of Example 29, wherein the plurality of services comprise a first service that utilizes a first framework and a second service that utilizes a second framework that is different than the first framework.

Example 36 is the apparatus of Example 29, wherein the plurality of services comprise a first service that utilizes a first programming language and a second service that utilizes a second programming language that is different than the first programming language.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
receiving, at a client device, a GraphQL query request for data comprising a plurality of query types associated with a plurality of services executed by a plurality of host systems;
identifying, by a processing device of the client device, the plurality of query types associated with the GraphQL query request;
sending the GraphQL query request and the plurality of query types identified as associated with the GraphQL query request from the client device to a gateway system and receiving at the client device a corresponding query routing data structure that identifies each service associated with each query type and routing information for each service, wherein the gateway system generates the query routing data structure by receiving a GraphQL service schema from each service and merging the GraphQL service schemas into a composable GraphQL query language schema;
transmitting the GraphQL query request from the client device to each of the plurality of services identified using the query routing data structure, wherein transmitting the GraphQL query request from the client device to each of the plurality of services comprises transmitting GraphQL queries to GraphQL application programming interfaces (APIs) associated with each of the plurality of services;
receiving query results from each of the plurality of services responsive to the GraphQL query request; and
aggregating the query results received from each of the plurality of services for presentation to a user.

2. The method of claim 1, wherein the query routing data structure comprises address information associated with the plurality of services.

3. The method of claim 1, wherein the query routing data structure comprises corresponding types of operations associated with each of the plurality of services.

4. The method of claim 1, wherein the plurality of services comprise two or more services that are executed by two or more different host systems of the plurality of host systems.

5. The method of claim 1, further comprising:
receiving first results of the GraphQL query request from a first service of the plurality of services at a first time; and
receiving second results of the GraphQL query request from a second service of the plurality of services at a second time that is different than the first time.

6. The method of claim 1, wherein the query routing data structure comprises a hashmap data structure.

7. The method of claim 1, wherein the plurality of services comprise a first service that utilizes a first framework and a second service that utilizes a second framework that is different than the first framework.

8. The method of claim 1, wherein the plurality of services comprise a first service that utilizes a first programming language and a second service that utilizes a second programming language that is different than the first programming language.

9. An apparatus comprising:
a memory; and
a processing device, operatively coupled to the memory, to:
receive a GraphQL query request and a plurality of query types associated with the GraphQL query request from a client device;
receive corresponding GraphQL service schemas from a plurality of services executed by a plurality of host systems;
identify corresponding types of queries for each of the plurality of services in view of the corresponding GraphQL service schemas of the plurality of services;
generate a query routing data structure comprising the corresponding types of queries for each of the plurality of services by merging the corresponding GraphQL service schemas into a composable GraphQL query language schema;
provide the query routing data structure to the client device, wherein the client device is to transmit additional GraphQL query requests to the plurality of services in view of the query routing data structure, wherein transmitting the additional GraphQL query requests from the client device to each of the plurality of services comprises transmitting GraphQL queries to GraphQL application programming interfaces (APIs) associated with each of the plurality of services;
receive query results from each of the plurality of services responsive to the additional GraphQL query requests; and
aggregate the query results received from each of the plurality of services for presentation to a user.

10. The apparatus of claim 9, wherein the composable GraphQL query language schema is a gateway schema that correlates the corresponding GraphQL service schemas to GraphQL query requests received by the client device.

11. The apparatus of claim 10, wherein the query routing data structure is generated in view of the gateway schema.

12. The apparatus of claim 9, wherein the query routing data structure comprises address information associated with the plurality of services.

13. The apparatus of claim 9, wherein the processing device is further to:
transmit a request for the corresponding GraphQL service schemas to each of the plurality of services.

14. The apparatus of claim 9, wherein the plurality of services comprise a first service that utilizes a first programming language and a second service that utilizes a second programming language that is different than the first programming language.

15. A non-transitory computer-readable storage medium including instructions that, when executed by a processing device of a first host system, cause the processing device to: generate a first query routing data structure comprising corresponding types of queries for each of a plurality of services executed by a plurality of host systems using corresponding GraphQL service schemas received from the plurality of services executed by the plurality of host systems and merged into a composable GraphQL query language schema; provide the first query routing data structure to a client device, wherein the client device is to transmit GraphQL query requests to the plurality of services in view of the first query routing data structure, wherein transmitting the GraphQL query requests from the client device to each of the plurality of services comprises transmitting GraphQL queries and associated query types to GraphQL application programming interfaces (APIs) associated with each of the plurality of services; identify a modification to the plurality of services in the first query routing data structure; generate a second query routing data structure comprising the modification to the plurality of services; provide the second query routing data structure to the client device; receive query results from each of the plurality of services responsive to the GraphQL query request; and aggregate the query results received from each of the plurality of services for presentation to a user.

16. The non-transitory computer-readable storage medium of claim 15, wherein the modification to the plurality of services comprises a removal of one or more services from the plurality of services.

17. The non-transitory computer-readable storage medium of claim 15, wherein the modification to the plurality of services comprises an addition of one or more services to the plurality of services.

18. The non-transitory computer-readable storage medium of claim 15, wherein the modification to the plurality of services comprises a migration of one or more services of the plurality of services.

19. The non-transitory computer-readable storage medium of claim 15, wherein the first query routing data structure and the second query routing data structure comprise address information associated with the plurality of services.

* * * * *